(12) United States Patent
Kaneko et al.

(10) Patent No.: US 9,334,463 B2
(45) Date of Patent: May 10, 2016

(54) LUBRICATING-OIL COMPOSITION FOR REFRIGERATION DEVICE

(71) Applicant: IDEMITSU KOSAN CO., LTD., Chiyoda-ku (JP)

(72) Inventors: Masato Kaneko, Chiba (JP); Takeo Tokiai, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 111 days.

(21) Appl. No.: 14/384,912

(22) PCT Filed: Mar. 7, 2013

(86) PCT No.: PCT/JP2013/056335
§ 371 (c)(1),
(2) Date: Sep. 12, 2014

(87) PCT Pub. No.: WO2013/137112
PCT Pub. Date: Sep. 19, 2013

(65) Prior Publication Data
US 2015/0048271 A1    Feb. 19, 2015

(30) Foreign Application Priority Data

Mar. 12, 2012  (JP) .................. 2012-055184

(51) Int. Cl.
  *C09K 5/04*  (2006.01)
  *C10M 169/04*  (2006.01)
  *C10M 171/00*  (2006.01)

(52) U.S. Cl.
  CPC ............ *C10M 169/04* (2013.01); *C09K 5/045* (2013.01); *C10M 171/008* (2013.01); *C09K 2205/126* (2013.01); *C09K 2205/22* (2013.01); *C09K 2205/24* (2013.01); *C10M 2207/126* (2013.01); *C10M 2209/043* (2013.01); *C10M 2209/1045* (2013.01); *C10M 2209/1055* (2013.01); *C10M 2219/044* (2013.01); *C10M 2223/041* (2013.01); *C10M 2223/049* (2013.01); *C10N 2220/021* (2013.01); *C10N 2220/301* (2013.01); *C10N 2220/302* (2013.01); *C10N 2230/06* (2013.01); *C10N 2230/08* (2013.01); *C10N 2230/10* (2013.01); *C10N 2230/70* (2013.01); *C10N 2240/02* (2013.01); *C10N 2240/30* (2013.01)

(58) Field of Classification Search
  CPC   C09K 5/045; C10M 171/008; C10M 169/04; F25B 31/002
  USPC ............... 252/68; 508/390, 408; 62/468, 529
  See application file for complete search history.

(56) References Cited

U.S. PATENT DOCUMENTS

| 4,927,554 | A | * | 5/1990 | Jolley | ............ | C09K 5/045 252/67 |
|---|---|---|---|---|---|---|
| 5,021,179 | A | * | 6/1991 | Zehler | ............ | C09K 5/045 252/68 |
| 5,405,546 | A | * | 4/1995 | Jolley | ............ | C09K 5/045 252/67 |
| 5,711,896 | A | * | 1/1998 | Kaimai | ............ | C10M 107/34 252/68 |
| 6,369,006 | B1 |  | 4/2002 | Sgarbi et al. | | |
| 6,475,405 | B1 | * | 11/2002 | Kawaguchi | ............ | C09K 5/045 252/68 |
| 9,212,426 | B2 | * | 12/2015 | Shibata | ............ | C10M 135/10 |
| 2001/0035518 | A1 | * | 11/2001 | Schnur | ............ | C08G 75/029 525/68 |
| 2001/0038088 | A1 | * | 11/2001 | Schnur | ............ | C09K 5/045 252/68 |
| 2002/0013233 | A1 |  | 1/2002 | Corr et al. | | |
| 2002/0077255 | A1 | * | 6/2002 | Kawaguchi | ............ | C09K 5/045 508/579 |
| 2003/0166478 | A1 | * | 9/2003 | Shimomura | ....... | C10M 171/008 508/304 |
| 2007/0213239 | A1 |  | 9/2007 | Kaneko | | |
| 2009/0000331 | A1 |  | 1/2009 | Nagao et al. | | |

(Continued)

FOREIGN PATENT DOCUMENTS

| CN | 101341234 A | 1/2009 |
|---|---|---|
| CN | 101528903 A | 9/2009 |

(Continued)

OTHER PUBLICATIONS

Combined Office Action and Search Report issued Oct. 9, 2015 in Chinese Patent Application No. 201380013645.2 (with English translation of Category of Cited Documents).

(Continued)

*Primary Examiner* — Douglas Mc Ginty
(74) *Attorney, Agent, or Firm* — Oblon, McClelland, Maier & Neustadt, L.L.P.

(57) ABSTRACT

A lubricating oil composition for a refrigerating machine according to the present invention includes: a base oil including as a main component at least one kind of oxygen-containing compound selected from polyoxyalkylene glycols, polyvinyl ethers, copolymers of poly(oxy)alkylene glycols or monoethers thereof and polyvinyl ethers, polyol esters, and polycarbonates; a sulfonic acid metal salt having a hydrocarbyl group; and a phosphoric acid ester. The lubricating oil composition for a refrigerating machine can enhance the abrasion resistance of a sliding part of a refrigerating machine using a refrigerant including at least one kind of fluorine-containing organic compound selected from compounds represented by the following molecular formula (A) or including a combination of the fluorine-containing organic compound and a saturated fluorinated hydrocarbon compound: $C_pO_qF_rR_s$ (A) [in the formula: R represents Cl, Br, I, or H; and p represents an integer of from 1 to 6, q represents an integer of from 0 to 2, r represents an integer of from 1 to 14, and s represents an integer of from 0 to 13, provided that, when q represents 0, p represents from 2 to 6 and one or more carbon-carbon unsaturated bonds are included in a molecule].

20 Claims, No Drawings

(56) References Cited

U.S. PATENT DOCUMENTS

| | | |
|---|---|---|
| 2009/0277212 A1 | 11/2009 | Kaneko et al. |
| 2010/0108936 A1 | 5/2010 | Kaneko |
| 2011/0023531 A1 | 2/2011 | Kaneko et al. |
| 2012/0083431 A1 | 4/2012 | Kaneko |
| 2013/0313469 A1 | 11/2013 | Kaneko |
| 2015/0141308 A1* | 5/2015 | Greaves ............... C10M 107/34 508/579 |

FOREIGN PATENT DOCUMENTS

| | | | |
|---|---|---|---|
| JP | 7-166186 A | 6/1995 | |
| JP | 7-507342 A | 8/1995 | |
| JP | 2002-535478 A | 10/2002 | |
| JP | 2003-183681 A | 7/2003 | |
| JP | 2006-503961 A | 2/2006 | |
| WO | WO 2006/030490 A1 | 3/2006 | |
| WO | WO 2007/029746 A1 | 3/2007 | |

OTHER PUBLICATIONS

Extended European Search Report issued Oct. 21, 2015 in Patent Application No. 13761923.5.

International Search Report issued Jun. 18, 2013 in PCT/JP2013/056335.

* cited by examiner

LUBRICATING-OIL COMPOSITION FOR REFRIGERATION DEVICE

TECHNICAL FIELD

The present invention relates to a lubricating oil composition for a refrigerating machine using an unsaturated fluorinated hydrocarbon compound, a fluorinated ether compound, a fluorinated alcohol compound, a fluorinated ketone compound, or the like as a refrigerant.

BACKGROUND ART

In a compression refrigerating machine such as an air conditioning apparatus or a car air conditioner, a chlorofluorocarbon (CFC), a hydrochlorofluorocarbon (HCFC), or the like has been mainly used heretofore. However, such compounds each contain chlorine that is responsible for environmental issues, and hence investigation has been conducted on a chlorine-free alternative refrigerant such as a hydrofluorocarbon (HFC).

A hydrofluorocarbon typified by, for example, 1,1,1,2-tetrafluoroethane, difluoromethane, pentafluoroethane, or 1,1,1-trifluoroethane (hereinafter referred to as "R134a", "R32", "R125", or "R143a", respectively) has been attracting attention, and, for example, R134a has been used in a car air conditioner system.

However, it has been recently pointed out that R143a also has a high global warming potential, or GWP, and hence so-called natural refrigerants such as carbon dioxide have attracted attention as additional alternative refrigerants from the viewpoint of environmental protection. However, carbon dioxide requires high pressure, and hence cannot be used in the current car air conditioner system.

A refrigerant having a specific polar structure in the molecule such as an unsaturated fluorinated hydrocarbon compound (see, for example, Patent Literature 1), a fluorinated ether compound (see, for example, Patent Literature 2), a fluorinated alcohol compound, or a fluorinated ketone compound has been found to be a refrigerant that has a low global warming potential and can be used in the current car air conditioner system.

However, the fact that replacement with the refrigerant such as the unsaturated fluorinated hydrocarbon compound, the fluorinated ether compound, the fluorinated alcohol compound, or the fluorinated ketone compound worsens abrasion at a sliding part has been perceived as a problem.

CITATION LIST

Patent Literature

[PTL 1] JP 2006-503961 A
[PTL 2] JP 07-507342 A

SUMMARY OF INVENTION

Technical Problem

In view of the foregoing, an object of the present invention is to provide a lubricating oil composition for a refrigerating machine capable of improving the abrasion resistance of a sliding part even when a refrigerant such as an unsaturated fluorinated hydrocarbon compound, a fluorinated ether compound, a fluorinated alcohol compound, or a fluorinated ketone compound is used.

Solution to Problem

As a result of their extensive studies, the inventors of the present invention have found that the object can be achieved by blending a lubricating oil composition for a compression refrigerating machine using a refrigerant such as an unsaturated fluorinated hydrocarbon compound, a fluorinated ether compound, a fluorinated alcohol compound, or a fluorinated ketone compound with a sulfonic acid metal salt having a specific hydrocarbyl group. The present invention has been completed on the basis of such finding.

That is, the present invention relates to the following:

[1] A lubricating oil composition for a refrigerating machine, which uses a refrigerant including at least one kind of fluorine-containing organic compound selected from compounds represented by the following molecular formula (A) or including a combination of the fluorine-containing organic compound and a saturated fluorinated hydrocarbon compound:

$$C_p O_q F_r R_s \qquad (A)$$

where: R represents Cl, Br, I, or H; and p represents an integer of from 1 to 6, q represents an integer of from 0 to 2, r represents an integer of from 1 to 14, and s represents an integer of from 0 to 13, provided that, when q represents 0, p represents from 2 to 6 and one or more carbon-carbon unsaturated bonds are included in a molecule the lubricating oil composition including:

a base oil including as a main component at least one kind of oxygen-containing compound selected from polyoxyalkylene glycols, polyvinyl ethers, copolymers of poly(oxy)alkylene glycols or monoethers thereof and polyvinyl ethers, polyol esters, and polycarbonates;

a sulfonic acid metal salt having a hydrocarbyl group; and a phosphoric acid ester.

Advantageous Effects of Invention

According to one embodiment of the present invention, it is possible to provide the lubricating oil composition for a refrigerating machine capable of improving the abrasion resistance of a sliding part even when a refrigerant such as an unsaturated fluorinated hydrocarbon compound, a fluorinated ether compound, a fluorinated alcohol compound, or a fluorinated ketone compound is used.

DESCRIPTION OF EMBODIMENTS

Hereinafter, the present invention is described in detail.

[Lubricating Oil Composition for Refrigerating Machine]

A lubricating oil composition for a refrigerating machine according to an embodiment of the present invention is a lubricating oil composition for a refrigerating machine, which uses a refrigerant including at least one kind of fluorine-containing organic compound selected from compounds represented by the following molecular formula (A) or including a combination of the fluorine-containing organic compound and a saturated fluorinated hydrocarbon compound:

$$C_p O_q F_r R_s \qquad (A)$$

[in the formula: R represents Cl, Br, I, or H; and p represents an integer of from 1 to 6, q represents an integer of from 0 to 2, r represents an integer of from 1 to 14, and s represents an integer of from 0 to 13, provided that, when q represents 0, p represents from 2 to 6 and one or more carbon-carbon unsaturated bonds are included in a molecule], the lubricating oil composition including: a base oil including as a main component at least one kind of oxygen-containing compound selected from polyoxyalkylene glycols, polyvinyl ethers, copolymers of poly(oxy)alkylene glycols or monoethers thereof and polyvinyl ethers, polyol esters, and polycarbonates, a sulfonic acid metal salt having a hydrocarbyl group, and a phosphoric acid ester.

<Refrigerant>

The molecular formula (A) represents the kind and number of the elements in the molecule. The formula (A) represents the fluorine-containing organic compound in which p as the number of the carbon atoms C represents from 1 to 6. As long as the fluorine-containing organic compound is a fluorine-containing organic compound having 1 to 6 carbon atoms, the fluorine-containing organic compound can have physical and chemical properties required for the refrigerant, such as a boiling point, a freezing point, and an evaporative latent heat.

In the molecular formula (A), a bonding form of p carbon atoms represented by $C_p$ includes a carbon-carbon single bond, an unsaturated bond such as a carbon-carbon double bond, a carbon-oxygen double bond, and the like. The carbon-carbon unsaturated bond is preferably a carbon-carbon double bond from the viewpoint of stability. The number of the carbon-carbon double bonds is 1 or more and is preferably 1.

In addition, in the molecular formula (A), a bonding form of q oxygen atoms represented by $O_q$ is preferably an ether group, and the oxygen atoms are preferably derived from ether groups, hydroxyl groups or carbonyl groups. The number of the oxygen atoms q may be 2, and the case where the compound has two ether groups, hydroxyl groups, or the like is also included.

In addition, in the case where q represents 0 in $O_q$ and no oxygen atom is included in the molecule, p represents from 2 to 6, and the molecule has one or more unsaturated bonds such as a carbon-carbon double bond. That is, at least one of bonding forms of p carbon atoms represented by $C_p$ needs to be a carbon-carbon unsaturated bond.

In addition, in the molecular formula (A), R represents Cl, Br, I, or H, and may represent anyone of them. R preferably represents H because of its less possibility of destroying an ozone layer.

As described above, suitable examples of the fluorine-containing organic compound represented by the molecular formula (A) include a fluorinated ether compound, a fluorinated alcohol compound, a fluorinated ketone compound, and an unsaturated fluorinated hydrocarbon compound. Hereinafter, those compounds are described.

<<Fluorinated Ether Compound>>

In the present invention, examples of the fluorinated ether compound to be used as a refrigerant for a refrigerating machine include fluorinated ether compounds represented by the molecular formula (A), where R represents H, p represents from 2 to 6, q represents 1 or 2, r represents from 1 to 14, and s represents from 0 to 13.

Preferred examples of such fluorinated ether compound include: a fluorinated compound of a chain aliphatic ether having 2 to 6 carbon atoms, 1 or 2 ether bonds, and a linear or branched alkyl group; and a fluorinated compound of a cyclic aliphatic ether having 3 to 6 carbon atoms and 1 or 2 ether bonds.

Specific examples thereof include dimethyl ethers having 1 to 6 fluorine atoms introduced, methyl ethyl ethers having 1 to 8 fluorine atoms introduced, dimethoxymethanes having 1 to 8 fluorine atoms introduced, methyl propyl ethers having 1 to 10 fluorine atoms introduced, methyl butyl ethers having 1 to 12 fluorine atoms introduced, ethyl propyl ethers having 1 to 12 fluorine atoms introduced, oxetanes having 1 to 6 fluorine atoms introduced, 1,3-dioxolanes having 1 to 6 fluorine atoms introduced, and tetrahydrofurans having 1 to 8 fluorine atoms introduced.

Examples of those fluorinated ether compounds include hexafluorodimethyl ether, pentafluorodimethyl ether, bis(difluoromethyl)ether, fluoromethyl trifluoromethyl ether, trifluoromethyl methyl ether, perfluorodimethoxymethane, 1-trifluoromethoxy-1,1,2,2-tetrafluoroethane, difluoromethoxypentanefluoroethane, 1-trifluoromethoxy-1,2,2,2-tetrafluoroethane, 1-difluoromethoxy-1,1,2,2-tetrafluoroethane, 1-difluoromethoxy-1,2,2,2-tetrafluoroethane, 1-trifluoromethoxy-2,2,2-trifluoroethane, 1-difluoromethoxy-2,2,2-trifluoroethane, perfluorooxetane, perfluoro-1,3-dioxolane, various isomers of pentafluorooxetane, and various isomers of tetrafluorooxetane.

In the present invention, one kind of the fluorinated ether compounds may be used alone, or two or more kinds thereof may be used in combination.

<<Fluorinated Alcohol Compound>>

In the present invention, examples of the fluorinated alcohol compound to be used as a refrigerant for a refrigerating machine and represented by the general formula (A) include fluorinated alcohol compounds represented by the molecular formula (A), where R represents H, p represents from 1 to 6, q represents 1 or 2, r represents from 1 to 13, and s represents from 1 to 13.

Preferred examples of such fluorinated alcohol compound include fluorinated compounds of linear or branched aliphatic alcohols having 1 to 6 carbon atoms and 1 or 2 hydroxyl groups.

Specific examples thereof include methyl alcohols having 1 to 3 fluorine atoms introduced, ethyl alcohols having 1 to 5 fluorine atoms introduced, propyl alcohols having 1 to 7 fluorine atoms introduced, butyl alcohols having 1 to 9 fluorine atoms introduced, pentyl alcohols having 1 to 11 fluorine atoms introduced, ethylene glycols having 1 to 4 fluorine atoms introduced, and propylene glycols having 1 to 6 fluorine atoms introduced.

Examples of those fluorinated alcohol compounds include monofluoromethyl alcohol, difluoromethyl alcohol, trifluoromethyl alcohol, various isomers of difluoroethyl alcohol, various isomers of trifluoroethyl alcohol, various isomers of tetrafluoroethyl alcohol, pentafluoroethyl alcohol, various isomers of difluoropropyl alcohol, various isomers of trifluoropropyl alcohol, various isomers of tetrafluoropropyl alcohol, various isomers of pentafluoropropyl alcohol, various isomers of hexafluoropropyl alcohol, heptafluoropropyl alcohol, various isomers of difluorobutyl alcohol, various isomers of trifluorobutyl alcohol, various isomers of tetrafluorobutyl alcohol, various isomers of pentafluorobutyl alcohol, various isomers of hexafluorobutyl alcohol, various isomers of heptafluorobutyl alcohol, various isomers of octafluorobutyl alcohol, nonafluorobutyl alcohol, various isomers of difluoroethylene glycol, trifluoroethylene glycol, tetrafluoroethylene glycol, and various isomers of difluoropropylene glycol, various isomers of trifluoropropylene glycol, various isomers of tetrafluoropropylene glycol, various isomers of pentafluoropropylene glycol, a fluorinated propylene glycol such as hexafluoropropylene glycol, and a fluorinated trimethylene glycol corresponding to the fluorinated propylene glycol.

In the present invention, one kind of the fluorinated alcohol compounds may be used alone, or two or more kinds thereof may be used in combination.

<<Fluorinated Ketone Compound>>

In the present invention, examples of the fluorinated ketone compound used as a refrigerant for a refrigerating machine include fluorinated ketone compounds represented by in the molecular formula (A), where R represents H, p represents from 2 to 6, q represents 1 or 2, r represents from 1 to 12, and s represents from 0 to 11.

Preferred examples of such fluorinated ketone compounds include fluorinated compounds of aliphatic ketones each having 3 to 6 carbon atoms and a linear or branched alkyl group.

Specific examples thereof include acetones having 1 to 6 fluorine atoms introduced, methyl ethyl ketones having 1 to 8 fluorine atoms introduced, diethyl ketones having 1 to 10 fluorine atoms introduced, and methyl propyl ketones having 1 to 10 fluorine atoms introduced.

Examples of those fluorinated ketone compounds include hexafluorodimethyl ketone, pentafluorodimethyl ketone, bis(difluoromethyl)ketone, fluoromethyl trifluoromethyl ketone, trifluoromethyl methyl ketone, perfluoromethyl ethyl ketone, trifluoromethyl-1,1,2,2-tetrafluoroethyl ketone, difluoromethyl pentafluoroethyl ketone, trifluoromethyl-1,1,2,2-tetrafluoroethyl ketone, difluoromethyl-1,1,2,2-tetrafluoroethyl ketone, difluoromethyl-1,2,2,2-tetrafluoroethyl ketone, trifluoromethyl-2,2,2-trifluoroethyl ketone, and difluoromethyl-2,2,2-trifluoroethyl ketone.

In the present invention, one kind of the fluorinated ketone compounds may be used alone, or two or more kinds thereof may be used in combination.

<<Unsaturated Fluorinated Hydrocarbon Compound>>

In the present invention, examples of the unsaturated fluorinated hydrocarbon compound used as a refrigerant for a refrigerating machine include unsaturated fluorinated hydrocarbon compounds represented by in the molecular formula (A), where R represents H, p represents from 2 to 6, q represents 0, r represents from 1 to 12, and s represents from 0 to 11.

Preferred examples of such unsaturated fluorinated hydrocarbon compounds include a fluorinated compound of a linear or branched chain olefin having 2 to 6 carbon atoms and a fluorinated compound of a cyclic olefin having 4 to 6 carbon atoms.

Specific examples thereof include ethylene having 1 to 3 fluorine atoms introduced, propene having 1 to 5 fluorine atoms introduced, butene having 1 to 7 fluorine atoms introduced, pentene having 1 to 9 fluorine atoms introduced, hexene having 1 to 11 fluorine atoms introduced, cyclobutene having 1 to 5 fluorine atoms introduced, cyclopentene having 1 to 7 fluorine atoms introduced, and cyclohexene having 1 to 9 fluorine atoms introduced.

Of those unsaturated fluorinated hydrocarbon compounds, a fluorinated compound of propene is preferred and for example, various isomers of pentafluoropropene, 3,3,3-trifluoropropene, and 1,3,3,3-tetrafluoropropene are suitable.

In the present invention, one kind of the unsaturated fluorinated hydrocarbon compounds may be used alone, or two or more kinds thereof may be used in combination.

The unsaturated fluorinated hydrocarbon compound is preferably used as the refrigerant. Of those, at least one kind selected from 1,1,1,2,3-pentafluoropropene (HFO-1225ye), 1,1,1,2-tetrafluoro-2-propene (HFO-1234yf), and 1,1,1,3-tetrafluoropropene (HFO-1234ze) is particularly preferably used.

<<Saturated Fluorinated Hydrocarbon Compound>>

The saturated fluorinated hydrocarbon compound is a refrigerant that may be mixed, as required, in at least one kind of fluorine-containing organic compound selected from the compounds represented by the general formula (A).

The saturated fluorinated hydrocarbon compound is preferably a fluorinated compound of an alkane having 2 to 4 carbon atoms and is particularly suitably a fluorinated compound of ethane, such as 1,1-difluoroethane, 1,1,1-trifluoroethane, 1,1,2-trifluoroethane, 1,1,1,2-tetrafluoroethane, 1,1,2,2-tetrafluoroethane, or 1,1,1,2,2-pentafluoroethane. One kind of the saturated fluorinated hydrocarbon compounds may be used alone, or two or more kinds thereof may be used in combination.

In addition, the blending amount of the saturated fluorinated hydrocarbon compound is typically 30 mass % or less, preferably 20 mass % or less, more preferably 10 mass % or less based on the total amount of the refrigerant.

<Base Oil>
<<Polyoxyalkylene Glycols>>

Examples of the polyoxyalkylene glycols that may be used as the base oil in the refrigerating machine oil composition of the present invention include compounds each represented by the following general formula (I):

$$R^1—[(OR^2)_m—OR^3]_n \quad (I)$$

(in the formula, $R^1$ represents a hydrogen atom, an alkyl group having 1 to 10 carbon atoms, an acyl group having 2 to 10 carbon atoms, or an aliphatic hydrocarbon group having 1 to 10 carbon atoms and 2 to 6 bonding sites, $R^2$ represents an alkylene group having 2 to 4 carbon atoms, $R^3$ represents a hydrogen atom, an alkyl group having 1 to 10 carbon atoms, or an acyl group having 2 to 10 carbon atoms, n represents an integer of from 1 to 6, and m represents such a number that an average value for m×n is from 6 to 80).

In the general formula (I), the alkyl group represented by $R^1$ or $R^3$ may be linear, branched, or cyclic. Specific examples of the alkyl group include a methyl group, an ethyl group, an n-propyl group, an isopropyl group, various butyl groups, various pentyl groups, various hexyl groups, various heptyl groups, various octyl groups, various nonyl groups, various decyl groups, a cyclopentyl group, and a cyclohexyl group. When the alkyl group has more than 10 carbon atoms, compatibility with the refrigerant reduces, with the result that the phase separation may occur. The alkyl group preferably has 1 to 6 carbon atoms.

In addition, an alkyl group moiety of the acyl group represented by $R^1$ or $R^3$ may be linear, branched, or cyclic. Specific examples of the alkyl group moiety of the acyl group include various groups each having 1 to 9 carbon atoms described as specific examples of the alkyl group. When the acyl group has more than 10 carbon atoms, compatibility with the refrigerant reduces, with the result that the phase separation may occur. The acyl group preferably has 2 to 6 carbon atoms.

When $R^1$ and $R^3$ each represent an alkyl group or an acyl group, $R^1$ and $R^3$ may be identical to or different from each other.

Further, when n represents 2 or more, a plurality of $R^3$'s in one molecule may be identical to or different from each other.

When $R^1$ represents an aliphatic hydrocarbon group having 1 to 10 carbon atoms and 2 to 6 bonding sites, the aliphatic hydrocarbon group may be linear or cyclic. Examples of the aliphatic hydrocarbon group having 2 bonding sites include an ethylene group, a propylene group, a butylene group, a pentylene group, a hexylene group, a heptylene group, an octylene group, a nonylene group, a decylene group, a cyclopentylene group, and a cyclohexylene group. In addition, examples of the aliphatic hydrocarbon group having 3 to 6 bonding sites may include residues each obtained by removing a hydroxyl group from a polyhydric alcohol such as trimethylolpropane, glycerin, pentaerythritol, sorbitol, 1,2,3-trihydroxycyclohexane, or 1,3,5-trihydroxycyclohexane.

When the aliphatic hydrocarbon group has more than 10 carbon atoms, compatibility with the refrigerant reduces, with the result that the phase separation may occur. The aliphatic hydrocarbon group preferably has 2 to 6 carbon atoms.

$R^2$ in the general formula (I) represents an alkylene group having 2 to 4 carbon atoms, and an oxyalkylene group as a repeating unit is, for example, an oxyethylene group, an oxypropylene group, or an oxybutylene group. The oxyalkylene groups in one molecule may be identical to each other, or may include two or more kinds of oxyalkylene groups. However, a compound containing at least an oxypropylene unit in one molecule is preferred, and in particular, a compound containing 50 mol % or more of oxypropylene units in the oxyalkylene units is suitable.

n in the general formula (I) represents an integer of from 1 to 6, and is determined in accordance with the number of bonding sites of $R^1$. For example, when $R^1$ represents an alkyl group or an acyl group, n represents 1, and when $R^1$ represents an aliphatic hydrocarbon group having 2, 3, 4, 5, or 6 bonding sites, n represents 2, 3, 4, 5, or 6, respectively. In addition, m represents such a number that an average value for m×n is from 6 to 80. When the average value for m×n deviates from the range, the object of the present invention cannot be sufficiently achieved.

The polyoxyalkylene glycols represented by the general formula (I) includes a polyoxyalkylene glycol having a hydroxyl group at any one of its terminals, and may be suitably used even when the compound contains the hydroxyl group as long as the content of the hydroxyl group is 50 mol % or less with respect to all terminal groups. A content of the hydroxyl group in excess of 50 mol % is not preferred because the moisture-absorbing property of the compound increases, and the viscosity index of the compound reduces.

As such polyoxyalkylene glycols, polyoxypropylene glycol dimethyl ether represented by the following general formula:

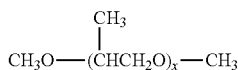

(in the formula, x represents a number of from 6 to 80), polyoxyethylene polyoxypropylene glycol dimethyl ether represented by the following general formula:

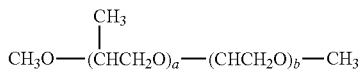

(in the formula, a and b each represent 1 or more and such a number so that a total thereof is from 6 to 80), polyoxypropylene glycol monobutyl ether represented by the following general formula:

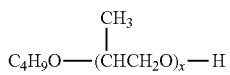

(in the formula, x represents a number of from 6 to 80), polyoxypropylene glycol diacetate, and the like are suitable from the viewpoints of economical efficiency and effects.

It should be noted that any one of those detailed in JP 2-305893 A may be used as the polyoxyalkylene glycols represented by the general formula (I).

In the present invention, one kind of those polyoxyalkylene glycols may be used alone, or two or more kinds thereof may be used in combination.

<<Polyvinyl Ethers>>

In the refrigerating machine oil composition of the present invention, the polyvinyl ethers that may be used as base oils are each a compound including, as a main component, a polyvinyl-based compound having a structural unit represented by the following general formula (II).

In the general formula (II), $R^4$, $R^5$, and $R^6$ each represent a hydrogen atom or a hydrocarbon group having 1 to 8 carbon atoms and may be identical to or different from each other. In this case, the hydrocarbon group specifically refers to: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. It should be noted that $R^4$, $R^5$, and $R^6$ above each particularly preferably represent a hydrogen atom or a hydrocarbon group having 3 or less carbon atoms.

On the other hand, $R^7$ in the general formula (II) represent a divalent hydrocarbon group having 2 to 10 carbon atoms. Specific examples of the divalent hydrocarbon group having 2 to 10 carbon atoms herein include: divalent aliphatic groups such as an ethylene group, a phenylethylene group, a 1,2-propylene group, 2-phenyl-1,2-propylene group, a 1,3-propylene group, various butylene groups, various pentylene groups, various hexylene groups, various heptylene groups, various octylene groups, various nonylene groups, and various decylene groups; alicyclic groups in which an alicyclic hydrocarbon has two bonding sites, such as cyclohexane, methylcyclohexane, ethylcyclohexane, dimethylcyclohexane, and propylcyclohexane; divalent aromatic hydrocarbon groups such as various phenylene groups, various methylphenylene groups, various ethylphenylene groups, various dimethylphenylene groups, and various naphthylenes; alkyl aromatic groups having monovalent bonding sites in each of the alkyl group moiety and the aromatic moiety of an alkyl aromatic hydrocarbon, such as toluene, xylene, and ethylbenzene; and alkyl aromatic groups each having a bonding site in the alkyl group moiety of a polyalkyl aromatic hydrocarbon such as xylene and diethylbenzene. Of those, aliphatic groups having 2 to 4 carbon atoms are particularly preferred. In addition, a plurality of $R^7O$'s are identical to or different from each other.

It should be noted that p in the general formula (II) represents the number of repetitions and such a number that an average value thereof falls within the range of from 0 to 10 or preferably from 0 to 5.

In addition, $R^8$ in the general formula (II) represents a hydrocarbon group having 1 to 10 carbon atoms. The hydrocarbon group herein specifically refers to: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups. Of those, a hydrocarbon group having 8 or less carbon atoms is preferred. When p represents 0, an alkyl group having 1 to 6 carbon atoms is preferred, and when p represents 1 or more, an alkyl group having 1 to 4 carbon atoms is particularly preferred.

The polyvinyl ether-based compound in the present invention has a structural unit represented by the general formula (II). The number of repetitions thereof (that is, polymerization degree) may be appropriately selected according to a desired kinematic viscosity and is typically from 2 to 50 mm²/s (100° C.) preferably from 3 to 40 mm²/s (100° C.)

The polyvinyl ether-based compound of the present invention may be produced by polymerization of the corresponding vinyl ether-based monomer. The vinyl ether-based monomer that may be used herein is represented by the following general formula (III):

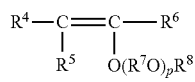

(III)

(in the formula, $R^4$, $R^5$, $R^6$, $R^7$, and $R^8$, and p each have the same meaning as that described above).

As the vinyl ether-based monomer, there are various compounds corresponding to the polyvinyl ether-based compound. Examples thereof include vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethylether, vinyl-2-methoxy-propylether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, and vinyl-2,6,9-trioxa-4-decyl ether; 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene. Those vinyl ether-based monomers may be produced by any known methods.

The terminals of the polyvinyl ether-based compound having the structural unit represented by the general formula (II) to be used as a main component of the refrigerating machine oil composition of the present invention may be converted to a desired structure by a method shown in this disclosure and a known method. As a converted group, there are given, for example, a saturated hydrocarbon, an ether, an alcohol, a ketone, an amide, and a nitrile.

The polyvinyl ether-based compound to be used in the base oil in the refrigerating machine oil composition of the present invention suitably has the following terminal structure.

That is, the polyvinyl ether-based compound has:
(1) a structure in which one of the terminals is represented by the following general formula (IV):

(in the formula, $R^9$, $R^{10}$, and $R^{11}$ each represent a hydrogen atom, or a hydrocarbon group having 1 to 8 carbon atoms and may be identical to or different from each other, $R^{12}$ represents a divalent hydrocarbon group having 2 to 10 carbon atoms, $R^{13}$ represents a hydrocarbon group having 1 to 10 carbon atoms, q represents such a number that an average value thereof is from 0 to 10, and when a plurality of $R^{12}O$'s are present, a plurality of $R^{12}O$'s may be identical to or different from each other), and the other terminal is represented by the following general formula (V):

(in the formula, $R^{14}$, $R^{15}$, and $R^{16}$ each represent a hydrogen atom, or a hydrocarbon group having 1 to 8 carbon atoms and may be identical to or different from each other, $R^{17}$ represents a divalent hydrocarbon group having 2 to 10 carbon atoms, $R^{18}$ represents a hydrocarbon group having 1 to 10 carbon atoms, r represents such a number that an average value thereof is from 0 to 10, and when a plurality of $R^{17}O$'s are present, a plurality of $R^{17}O$'s may be identical to or different from each other);
(2) a structure in which one of the terminals is represented by the general formula (IV) and the other terminal is represented by the following general formula (VI):

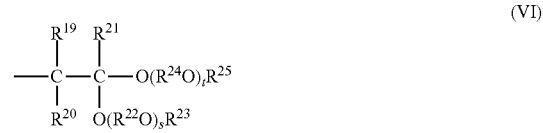

(in the formula, $R^{19}$, $R^{20}$, and $R^{21}$ each represent a hydrogen atom, or a hydrocarbon group having 1 to 8 carbon atoms and may be identical to or different from each other, $R^{22}$ and $R^{24}$ each represent a divalent hydrocarbon group having 2 to 10 carbon atoms and may be identical to or different from each other, $R^{23}$ and $R^{25}$ each represent a hydrocarbon group having 1 to 10 carbon atoms and may be identical to or different from each other, s and t each represent such a number that an average value thereof is from 0 to 10 and may be identical to or different from each other, when a plurality of $R^{22}O$'s are present, a plurality of $R^{22}O$'s may be identical to or different from each other, and when a plurality of $R^{24}O$'s are present, a plurality of $R^{24}O$'s may be identical to or different from each other);

(3) a structure in which one of the terminals is represented by the general formula (IV) and the other terminal has an olefinically unsaturated bond; or (4) a structure in which one of the terminals is represented by the general formula (IV) and the other terminal is represented by the following general formula (VII):

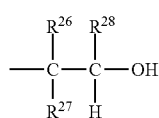

(VII)

(in the formula, $R^{26}$, $R^{27}$, and $R^{28}$ each represent a hydrogen atom, or a hydrocarbon group having 1 to 8 carbon atoms and may be identical to or different from each other).

The polyvinyl ether-based mixture may be a mixture including two or more kinds of polyvinyl ether-based compounds selected from those having the terminal structures according to the above-mentioned items (1) to (4). Preferred examples of the mixture may include a mixture of the compounds according to the above-mentioned items (1) and (4) and a mixture of the compounds according to the above-mentioned items (2) and (3).

The kinematic viscosity of the refrigerating machine oil composition before being mixed in the refrigerant is preferably from 2 to 50 mm²/s at 100° C. Therefore, it is preferred to select the raw material, the initiator, and the reaction condition so as to produce a polyvinyl ether-based compound having the viscosity in the range. In addition, the number average molecular weight of the polymer is typically 500 or more preferably from 600 to 3,000. It should be noted that even the polymer having the kinematic viscosity out of the range may be adjusted to have the kinematic viscosity in the range by mixing with a polymer having another kinematic viscosity.

In the present invention, one kind of the polyvinyl ether-based compounds may be used alone, or two or more kinds thereof may be used in combination.

<<Copolymer of Poly(Oxy)Alkylene Glycol or Monoether Thereof and Polyvinyl Ether>>

It should be noted that the poly(oxy)alkylene glycol is a concept including both polyalkylene glycol and polyoxyalkylene glycol. In the refrigerating machine oil composition of the present invention, examples of the copolymer of poly (oxy)alkylene glycol or a monoether thereof and polyvinyl ether that may be used as a base oil may include copolymers represented by the following general formula (VIII) and the following general formula (IX) (hereinafter referred to as polyvinyl ether-based copolymer I and polyvinyl ether-based copolymer II, respectively).

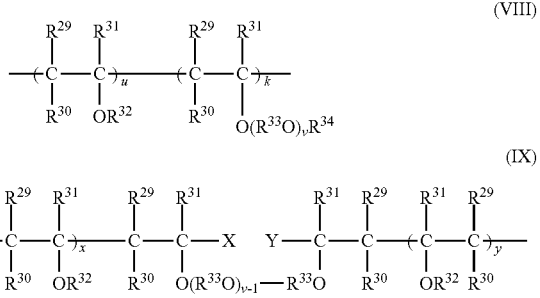

In the general formula (VIII), $R^{29}$, $R^{30}$, and $R^{31}$ each represent a hydrogen atom, or a hydrocarbon group having 1 to 8 carbon atoms and may be identical to or different from each other, $R^{33}$ represents a divalent hydrocarbon group having 2 to 4 carbon atoms, $R^{34}$ represents an aliphatic or alicyclic hydrocarbon group having 1 to 20 carbon atoms, an aromatic group that may have a substituent having 1 to 20 carbon atoms, an acyl group having 2 to 20 carbon atoms, or an oxygen-containing hydrocarbon group having 2 to 50 carbon atoms, $R^{32}$ represents a hydrocarbon group having 1 to 10 carbon atoms, and when a plurality of $R^{34}$'s, $R^{33}$'s, and $R^{32}$'s are present, a plurality of $R^{34}$'s, $R^{33}$'s, and $R^{32}$'s may be identical to or different from each other.

Herein, specific examples of the hydrocarbon group having 1 to 8 carbon atoms represented by any one of $R^{29}$ to $R^{31}$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; a cyclopentyl group, a cyclohexyl group, various methylcyclohexyl groups, various ethylcyclohexyl groups, and various dimethylcyclohexyl groups; aryl groups such as various dimethylphenyl groups; and arylalkyl groups such as a benzyl group, various phenylethyl groups, and various methylbenzyl groups. It should be noted that $R^{29}$, $R^{30}$, and $R^{31}$ each particularly preferably represent a hydrogen atom.

Specific examples of the divalent hydrocarbon group having 2 to 4 carbon atoms represented by $R^{33}$ include divalent alkylene groups such as a methylene group, an ethylene group, a propylene group, a trimethylene group, and various butylene groups.

It should be noted that v in the general formula (VIII) represents the number of repetitions of $R^{33}O$ and represents such a number that an average value thereof falls within the range of from 1 to 50, preferably from 1 to 20, more preferably from 1 to 10, particularly preferably 1 to 5. When a plurality of $R^{33}O$'s are present, a plurality of $R^{33}O$'s are identical to or different from each other.

In addition, k represents a number of from 1 to 50, preferably from 1 to 10, more preferably 1 or 2, particularly preferably 1, and u represents a number of from 0 to 50, preferably from 2 to 25, more preferably from 5 to 15. When a plurality of k's and u's are present, each of the polymers may be a block polymer or a random polymer.

Further, $R^{34}$ in the general formula (VIII) preferably represents an alkyl group having 1 to 10 carbon atoms, an acyl group having 2 to 10 carbon atoms, or an oxygen-containing hydrocarbon group having 2 to 50 carbon atoms.

Specific examples of the alkyl group having 1 to 10 carbon atoms include a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methylcyclohexyl groups, various ethylcyclohexyl groups, various propylcyclohexyl groups, and various dimethylcyclohexyl groups.

In addition, examples of the acyl group having 2 to 10 carbon atoms may include an acetyl group, a propionyl group, a butyryl group, an isobutyryl group, a valeryl group, an isovaleryl group, a pivaloyl group, a benzoyl group, and a toluoyl group.

Further, preferred specific examples of the oxygen-containing hydrocarbon group having 2 to 50 carbon atoms may include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, and a (1-methyl-2-methoxy)propyl group.

In the general formula (VIII), specific examples of the hydrocarbon group having 1 to 10 carbon atoms represented by $R^{32}$ include: alkyl groups such as a methyl group, an ethyl group, an n-propyl group, an isopropyl group, an n-butyl group, an isobutyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

It should be noted that $R^{29}$ to $R^{31}$, $R^{34}$, $R^{33}$, and v, and $R^{29}$ to $R^{32}$ may be identical to or different from each other among structural units.

The polyvinyl ether-based copolymer I having the structural unit represented by the general formula (VIII) has effects of improving the lubricity, insulating property, moisture-absorbing property, and the like while satisfying the compatibility because the polyvinyl ether-based copolymer I is a copolymer. In this case, those properties of the oil agent can be adjusted to the intended level by selecting the kind of the monomer as a raw material, the kind of the initiator, and the ratio of the copolymer. Therefore, the polyvinyl ether-based copolymer I has such an effect that an oil agent depending on requirements of the type of a compressor in a refrigerating system or a conditioner system, and the lubricity, the compatibility, and the like, which are different according to the material of a lubricating part, refrigerating capacity, the kind of the refrigerant, and the like, can be obtained freely.

On the other hand, in the polyvinyl ether-based copolymer II represented by the general formula (IX), $R^{29}$ to $R^{32}$, $R^{33}$, and v each have the same meaning as that described above. When a plurality of $R^{33}$'s and $R^{32}$'s are present, each of $R^{33}$'s and $R^{32}$'s may be identical to or different from each other. x and y each represent a number of from 1 to 50. When a plurality of x's and y's are present, each of the polymers may be a block polymer or a random polymer. X and Y each independently represent a hydrogen atom, a hydroxyl group, or a hydrocarbon group having 1 to 20 carbon atoms.

A production method for the polyvinyl ether-based copolymer I represented by the general formula (VIII) is not particularly limited as long as the polyvinyl ether-based copolymer I can be obtained. For example, the polyvinyl ether-based copolymer I may be produced by the following production methods 1 to 3.

(Production Method 1 for Polyvinyl Ether-Based Copolymer I)

In the product ion method 1, a poly(oxy)alkylene glycol compound represented by the following general formula (X):

(in the formula, $R^{33}$, $R^{34}$, and v each have the same meaning as that described above), is used as an initiator, and a vinyl ether-based compound represented by the following general formula (XI):

(in the formula, $R^{29}$ to $R^{32}$ each have the same meaning as that described above), is polymerized, whereby the polyvinyl ether-based copolymer I can be obtained.

Examples of the poly(oxy)alkylene glycol compound represented by the general formula (X) include (oxy)alkylene glycol monoethers such as ethylene glycol monomethyl ether, diethylene glycol monomethyl ether, triethylene glycol monomethyl ether, propylene glycol monomethyl ether, dipropylene glycol monomethyl ether, and tripropylene glycol monomethyl ether.

Examples of the vinyl ether-based compound represented by the general formula (XI) include: vinyl ethers such as vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, and vinyl-n-hexyl ether; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, and 2-tert-butoxy-2-butene. Those vinyl ether-based monomers may be produced by any known methods.

(Production Method 2 for Polyvinyl Ether-Based Copolymer I)

In the production method 2, an acetal compound represented by the following general formula (XII):

(in the formula, $R^{29}$ to $R^{34}$, and v each have the same meaning as that described above), is used as an initiator, and the vinyl ether-based compound represented by the general formula (XI) is polymerized, whereby the polyvinyl ether-based copolymer I can be obtained.

Examples of the acetal compound represented by the general formula (XII) include acetaldehyde methyl(2-methoxyethyl)acetal, acetaldehyde ethyl(2-methoxyethyl)acetal, acetaldehyde methyl(2-methoxy-1-methylethyl)acetal, acetaldehyde ethyl(2-methoxy-1-methylethyl)acetal, acetaldehyde methyl[2-(2-methoxyethoxy)ethyl]acetal, acetaldehyde ethyl[2-(2-methoxyethoxy)ethyl]acetal, acetaldehyde methyl[2-(2-methoxyethoxy)-1-methylethyl]acetal, and acetaldehyde ethyl[2-(2-methoxyethoxy)-1-methylethyl]acetal.

In addition, the acetal compound represented by the general formula (XII) may be produced by reacting one molecule of the poly(oxy)alkylene glycol compound represented by the general formula (X) with one molecule of the vinyl ether-based compound represented by the general formula (XI). The obtained acetal compound may be used as an initiator after being isolated or as it is.

(Production Method 3 for Polyvinyl Ether-Based Copolymer I)

In the production method 3, an acetal compound represented by the following general formula (XIII) is used as an initiator, and the vinyl ether-based compound represented by the general formula (XI) is polymerized, whereby the polyvinyl ether-based copolymer I can be obtained.

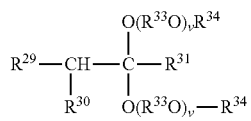

(XIII)

(In the formula, $R^{29}$ to $R^{31}$, $R^{33}$, $R^{34}$ and v each have the same meaning as that described above.)

Examples of the acetal compound represented by the general formula (XIII) include acetaldehyde di(2-methoxyethyl)acetal, acetaldehyde di(2-methoxy-1-methylethyl)acetal, acetaldehyde di[2-(2-methoxyethoxy)ethyl]acetal, and acetaldehyde di[2-(2-methoxyethoxy)-1-methylethyl]acetal.

In addition, the acetal compound represented by the general formula (XIII) may be produced by reacting one molecule of the poly(oxy)alkylene glycol compound represented by the general formula (X) with one molecule of a vinyl ether-based compound represented by the following general formula (XIV).

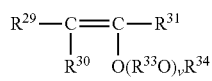

(XIV)

(In the formula, $R^{29}$ to $R^{31}$, $R^{33}$, $R^{34}$, and v each have the same meaning as that described above.)

The obtained acetal compound may be used as an initiator after being isolated or as it is.

The vinyl ether-based copolymer I represented by the general formula (VIII) may be a vinyl ether-based copolymer I having a structure in which one of the terminals is represented by the following formula (XV) or (XVI):

(XV)

(XVI)

(in the formulae, $R^{29}$ to $R^{34}$, and v each have the same meaning as that described above), and the other terminal is represented by the following general formula (XVII) or the following general formula (XVIII).

(XVII)

(XVIII)

(In the formulae, $R^{29}$ to $R^{31}$, and v each have the same meaning as that described above.)

Of those polyvinyl ether-based copolymers 1, the following are particularly suitable for the base oil in the refrigerating machine oil composition of the present invention.

(1) A substance having a structure in which one of the terminals is represented by the general formula (XV) or (XVI), and the other terminal is represented by the general formula (XVII) or (XVIII), and in the general formula (VIII), all $R^{29}$, $R^{30}$, and $R^{31}$ represent hydrogen atoms, v represents a number of from 1 to 4, $R^{33}$ represents a divalent hydrocarbon group having 2 to 4 carbon atoms, $R^{34}$ represents an alkyl group having 1 to 10 carbon atoms, and $R^{32}$ represents a hydrocarbon group having 1 to 10 carbon atoms.

(2) A substance having a structure in which one of the terminals is represented by the general formula (XV), and the other terminal is represented by the general formula (XVIII), and in the general formula (VIII), all $R^{29}$, $R^{30}$, and $R^{31}$ represent hydrogen atoms, v represents a number of from 1 to 4, $R^{33}$ represents a divalent hydrocarbon group having 2 to 4 carbon atoms, $R^{34}$ represents an alkyl group having 1 to 10 carbon atoms, and $R^{32}$ represents a hydrocarbon group having 1 to 10 carbon atoms.

(3) A substance having a structure in which one of the terminals is represented by the general formula (XVI), and the other terminal is represented by the general formula (XVII), and in the general formula (VIII), all $R^{29}$, $R^{30}$, and $R^{31}$ represent hydrogen atoms, v represents a number of from 1 to 4, $R^{33}$ represents a divalent hydrocarbon group having 2 to 4 carbon atoms, $R^{34}$ represents an alkyl group having 1 to 10 carbon atoms, and $R^{32}$ represents a hydrocarbon group having 1 to 10 carbon atoms.

On the other hand, a production method for the polyvinyl ether-based copolymer II represented by the general formula (IX) is not particularly limited as long as the polyvinyl ether-based copolymer II can be obtained, and the polyvinyl ether-based copolymer II can be produced efficiently by the following method.

(Production Method for Polyvinyl Ether-Based Copolymer II)

The polyvinyl ether-based copolymer II represented by the general formula (IX) can be obtained by using, as a initiator, poly(oxy)alkylene glycol represented by the following general formula (XIX):

$$HO-(R^{33}O)_v-H \quad (XIX)$$

(in the formula, $R^{33}$ and v each have the same meaning as that described above), and polymerizing the vinyl ether compound represented by the general formula (XI).

Examples of the poly(oxy)alkylene glycol represented by the general formula (XIX) may include ethylene glycol, diethylene glycol, triethylene glycol, polyethylene glycol, propylene glycol, dipropylene glycol, and polypropylene glycol.

In the present invention, one kind of the copolymers of the poly(oxy)alkylene glycols or monoethers thereof and polyvinyl ethers may be used alone, or two or more kinds thereof may be used in combination.

<<Polyol Esters>>

An ester of a diol or a polyol having about 3 to 20 hydroxyl groups and a fatty acid having about 1 to 24 carbon atoms is preferably used as the polyol esters that may be used as the base oil in the refrigerating machine oil composition of the present invention. Herein, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, and 1,12-dodecanediol. Examples of the polyol include: polyhydric alcohols such as trimethylolethane, trimethylolpropane, trimethylolbutane, di-(trimethylolpropane), tri-(trimethylolpropane), pentaerythritol, di-(pentaerythritol), tri-(pentaerythritol), glycerin, polyglycerin (formed of 2 to 20 glycerin molecules), 1,3,5-pentanetriol, sorbitol, sorbitan, a sorbitol glycerin condensate, adonitol, arabitol, xylitol, and mannitol; saccharides such as xylose, arabinose, ribose, rhamnose, glucose, fructose, galactose, mannose, sorbose, cellobiose, maltose, isomaltose, trehalose, sucrose, raffinose, gentianose, and melenzitose; and partially etherified products thereof, and methyl glucosides (glycosides). Of those, a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is preferred as the polyol.

The fatty acid may have any number of carbon atoms without any particular limitation, but a fatty acid having 1 to 24 carbon atoms is typically used. Of the fatty acids each having 1 to 24 carbon atoms, a fatty acid having 3 or more carbon atoms is preferred, a fatty acid having 4 or more carbon atoms is more preferred, fatty acid having 5 or more carbon atoms is still more preferred, and a fatty acid having 10 or more carbon atoms is most preferred in terms of lubricity. In addition, a fatty acid having 18 or less carbon atoms is preferred, a fatty acid having 12 or less carbon atoms is more preferred, and a fatty acid having 9 or less carbon atoms is still more preferred in terms of compatibility with the refrigerant.

In addition, the fatty acid may be a linear fatty acid or a branched fatty acid. Of those, a linear fatty acid is preferred in terms of lubricity, and a branched fatty acid is preferred in terms of hydrolytic stability. Further, the fatty acid may be a saturated fatty acid or an unsaturated fatty acid.

Examples of the fatty acid include: linear or branched fatty acids such as pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, and oleic acid; and so-called neo acids having quaternary α-carbon atoms. More specifically, valeric acid (n-pentanoic acid), caproic acid (n-hexanoic acid), enanthic acid (n-heptanoic acid), caprylic acid (n-ocatanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like are preferred.

It should be noted that the polyol ester may be a partial ester in which some of the hydroxyl groups of a polyol remain without being esterified, may be a complete ester in which all of the hydroxyl groups of the polyol are esterified, or may be a mixture of a partial ester and a complete ester. Of those, a complete ester is preferred.

Of the polyol esters, an ester of a hindered alcohol such as neopentyl glycol, trimethylolethane, trimethylolpropane, trimethylolbutane, di-(trimethylolpropane), tri-(trimethylolpropane), pentaerythritol, di-(pentaerythritol), or tri-(pentaerythritol) is more preferred, and an ester of neopentyl glycol, trimethylolethane, trimethylolpropane, trimethylolbutane, or pentaerythritol is still more preferred because such ester is additionally excellent in hydrolytic stability. An ester of pentaerythritol is most preferred because the ester is particularly excellent in compatibility with the refrigerant and hydrolytic stability.

Preferred specific examples of the polyol ester include: a diester formed of neopentyl glycol and one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylolethane and one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylolpropane and one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester formed of trimethylolbutane and one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester formed of pentaerythritol and one kind or two or more kinds of fatty acids selected from valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

It should be noted that the esters with two or more kinds of fatty acids may be a mixture of two or more kinds of esters formed of one kind of fatty acid and a polyol. An ester formed of two or more kinds of mixed fatty acids and a polyol, particularly an ester formed of mixed fatty acids and a polyol is excellent in low temperature properties and compatibility with a refrigerant.

<<Polycarbonates>>

A preferred example of the polycarbonates that may be used as the base oil in the refrigerating machine oil composition of the present invention include may be at least one kind selected from polycarbonates each having two or more carbonate bonds in one molecule, that is: compounds each represented by the following general formula (XX):

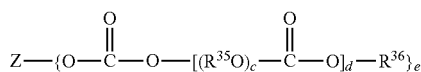
(XX)

(in the formula: Z represents a residue obtained by removing a hydroxyl group from an e-valent alcohol having 1 to 12 carbon atoms; $R^{35}$ represents a linear or branched alkylene group having 2 to 10 carbon atoms; $R^{36}$ represents a monovalent hydrocarbon group having 1 to 12 carbon atoms or a group containing an ether bond represented by $R^{38}(O\text{—}R^{37})_f\text{—}$ (where $R^{38}$ represents a hydrogen atom or a monovalent hydrocarbon group having 1 to 12 carbon atoms, $R^{37}$ represents a linear or branched alkylene group having 2 to 10 carbon atoms, and f represents an integer of from 1 to 20); c represents an integer of from 1 to 30, d represents an integer of from 1 to 50; and e represents an integer of from 1 to 6; and (ii) compounds each represented by the following general formula (XXI):

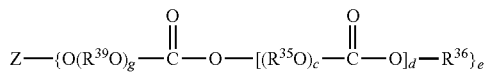
(XXI)

(in the formula: $R^{39}$ represents a linear or branched alkylene group having 2 to 10 carbon atoms; g represents an integer of from 1 to 20; and Z, $R^{35}$, $R^{36}$, c, d, and e each have the same meaning as that described above).

In the general formula (XX) and the general formula (XXI), Z, which represents a residue obtained by removing a hydroxyl group from a monovalent to hexavalent alcohol having 1 to 12 carbon atoms, particularly preferably represents a residue obtained by removing a hydroxyl group from a monovalent alcohol having 1 to 12 carbon atoms.

Examples of the monovalent to hexavalent alcohols having 1 to 12 carbon atoms for the residue represented by Z include, as the monovalent alcohols: aliphatic monovalent alcohols such as methyl alcohol, ethyl alcohol, n- or isopropyl alcohol, various butyl alcohols, various pentyl alcohols, various hexyl alcohols, various octyl alcohols, various decyl alcohols, and various dodecyl alcohols; alicyclic monovalent alcohols such as cyclopentyl alcohol and cyclohexyl alcohol; aromatic alcohols such as phenol, cresol, xylenol, butylphenol, and naphthol; and aromatic aliphatic alcohols such as benzyl alcohol and phenethyl alcohol; as the bivalent alcohols: aliphatic alcohols such as ethylene glycol, propylene glycol, butylene glycol, neopentylene glycol, and tetramethylene glycol; alicyclic alcohols such as cyclohexanediol and cyclohexanedimethanol; and aromatic alcohols such as catechol, resorcinol, hydroquinone, and dihydroxydiphenyl; as trivalent alcohols: aliphatic alcohols such as glycerin, trimethylolpropane, trimethylolethane, trimethylolbutane, and 1,3,5-pentanetriol; alicyclic alcohols such as cyclohexanetriol and cyclohexanetrimethanol; and aromatic alcohols such as pyrogallol and methylpyrogallol; and as tetravalent to hexavalent alcohols, aliphatic alcohols such as pentaerythritol, diglycerin, triglycerin, sorbitol, and dipentaerythritol.

Examples of such polycarbonate compound include: as the compounds each represented by the general formula (XX), compounds each represented by the following general formula (XX-a):

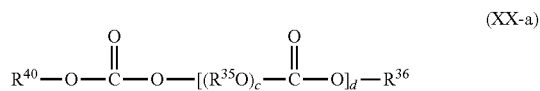
(XX-a)

(in the formula, $R^{40}$ represents a residue obtained by removing a hydroxyl group from a monovalent alcohol having 1 to 12 carbon atoms, and $R^{35}$, $R^{36}$, c, and d each have the same meaning as that described above); and/or, as the compounds each represented by the general formula (XXI), compounds each represented by the following general formula (XXI-a):

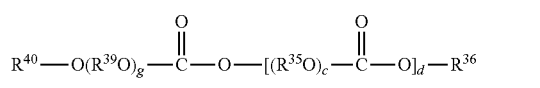
(XXI-a)

(in the formula, $R^{35}$, $R^{36}$, $R^{39}$, $R^{40}$, c, d, and g each have the same meaning as that described above).

Examples of the residue obtained by removing a hydroxyl group from a monovalent alcohol having 1 to 12 carbon atoms represented by $R^{40}$ in each of the general formula (XX-a) and the general formula (XXI-a) include: aliphatic hydrocarbon groups such as a methyl group, an ethyl group, an n-propyl group, an isopropyl group, various butyl groups, various pentyl groups, various hexyl groups, various octyl groups, various decyl groups, and various dodecyl groups; alicyclic hydrocarbon groups such as a cyclopentyl group, a cyclohexyl group, a methylcyclohexyl group, a dimethylcyclohexyl group, and a decahydronaphthyl group; aromatic hydrocarbon groups such as a phenyl group, various tolyl groups, various xylyl groups, a mesityl group, and various naphthyl groups; and aromatic aliphatic hydrocarbon groups such as a benzyl group, a methylbenzyl group, a phenethyl group, and various naphthylmethyl groups. Of those, a linear or branched alkyl group having 1 to 6 carbon atoms is preferred.

$R^{35}$, which represents a linear or branched alkylene group having 2 to 10 carbon atoms, preferably represents a linear or branched alkylene group having 2 to 6 carbon atoms, and particularly suitably represents an ethylene group or a propylene group in terms of, for example, the performance of the compound and the ease with which the compound is produced. Further, $R^{36}$ represents a monovalent hydrocarbon group having 1 to 12 carbon atoms or a group containing an ether bond represented by $R^{38}(O\text{—}R^{37})_f\text{—}$ (where $R^{38}$ represents a hydrogen atom or a monovalent hydrocarbon group having 1 to 12, preferably 1 to 6 carbon atoms, $R^{37}$ represents a linear or branched alkylene group having 2 to 10 carbon atoms, and f represents an integer of from 1 to 20), and examples of the monovalent hydrocarbon group having 1 to 12 carbon atoms may include examples similar to those described in the description of $R^{40}$. In addition, the linear or branched alkylene group having 2 to 10 carbon atoms represented by $R^{37}$ is preferably a linear or branched alkylene group having 2 to 6 carbon atoms, particularly preferably an ethylene group or a propylene group by the same reason as that in the case of $R^{35}$.

$R^{36}$ particularly preferably represents a linear or branched alkyl group having 1 to 6 carbon atoms.

The linear or branched alkylene group having 2 to 10 carbon atoms represented by $R^{39}$ in the general formula (XXI-a) is preferably a linear or branched alkylene group having 2 to 6 carbon atoms, particularly preferably an ethylene group or a propylene group by the same reason as that in the case of $R^{35}$.

Such polycarbonate compound may be produced by any one of various methods, and a target polycarbonate compound may be typically produced by causing a carbonate-formable derivative such as a carbonic acid diester or phosgene and an alkylene glycol or a polyalkylene glycol to react with each other in accordance with a known method.

In the present invention, one kind of those polycarbonates may be used alone, or two or more kinds thereof may be used in combination.

In the refrigerating machine oil composition of the present invention, as a base oil, a substance including, as a main component, at least one kind of oxygen-containing compound selected from the polyoxyalkylene glycols, polyvinyl ethers, copolymers of poly(oxy)alkylene glycols or monoethers thereof and polyvinyl ethers, polyol esters, and polycarbonates is used. Herein, the phrase "including as a main component" refers to including the oxygen-containing compound at a ratio of 50 mass % or more. The content of the oxygen-containing compound in the base oil is preferably 70 mass % or more, more preferably 90 mass % or more, still more preferably 100 mass %.

In the present invention, the kinematic viscosity of the base oil at 100° C. is preferably from 2 to 50 mm$^2$/s, more preferably from 3 to 40 mm$^2$/s, still more preferably from 4 to 30 mm$^2$/s. When the kinematic viscosity is 2 mm$^2$/s or more, satisfactory lubricity (load capacity resistance) is exhibited and sealing property is good, and when the kinematic viscosity is 50 mm$^2$/s or less, energy saving is also satisfactory.

In addition, the number average molecular weight of the base oil is preferably 500 or more, more preferably from 600 to 3,000, still more preferably from 700 to 2,500. The flashing point of the base oil is preferably 150° C. or more. When the number average molecular weight of the base oil is 500 or more, the desired performance of the refrigerating machine oil can be exhibited and the flashing point of the base oil can be set to 150° C. or more.

In the present invention, when the base oil has the above-mentioned properties, the refrigerating machine oil composition to be used may include, in addition to the oxygen-containing compound, another base oil at a ratio of 50 mass % or less, preferably 30 mass % or less, more preferably 10 mass % or less, and the refrigerating machine oil composition free of another base oil is still more preferred.

Examples of the base oil that may be used together with the oxygen-containing compound may include other polyesters, a hydrogenated product of an α-olefin oligomer, a mineral oil, an alicyclic hydrocarbon compound, and an alkylated aromatic hydrocarbon compound.

Of those compounds described above, as the base oil, there may be used polyoxypropylene glycol dimethyl ether, polyoxypropylene-polyoxyethylene copolymer dimethyl ether, a polyethyl vinyl ether-polyisobutyl vinyl ether copolymer, and a polyoxyalkylene glycol-modified polyvinyl ether copolymer. In particular, a base oil containing a polyoxyalkylene glycol is preferably used.

<Sulfonic Acid Metal Salt Having Hydrocarbyl Group>

The sulfonic acid metal salt having a hydrocarbyl group can improve the abrasion resistance of a sliding part by being blended into the lubricating oil composition for a refrigerating machine using an unsaturated fluorinated hydrocarbon compound, a fluorinated ether compound, a fluorinated alcohol compound, a fluorinated ketone compound, or the like as a refrigerant.

From the foregoing viewpoint, the blending amount of the sulfonic acid metal salt having a hydrocarbyl group is preferably from 0.001 to 2%, more preferably from 0.005 to 0.5%, still more preferably from 0.01 to 0.2% with respect to the total amount of the lubricating oil composition.

As long as the blending amount of the sulfonic acid metal salt having a hydrocarbyl group falls within the range, the extent to which the salt can contribute to an improvement in abrasion resistance of the sliding part enlarges as its addition amount increases.

Each of a petroleum-based sulfonate and a synthetic sulfonate is available as a sulfonic acid constituting the sulfonic acid metal salt having a hydrocarbyl group. The hydrocarbyl group preferably has 8 to 40 carbon atoms. A hydrocarbyl group having 12 to 20 carbon atoms is particularly preferred.

The hydrocarbyl group having 8 to 40 carbon atoms refers to a linear, branched, or cyclic alkyl group or alkenyl group having 8 to 40 carbon atoms, an aryl group having 8 to 40 carbon atoms, or an aralkyl group having 9 to 20 carbon atoms. In the aryl group and the aralkyl group, one or more alkyl groups may be introduced in its aromatic ring.

The metal constituting the sulfonic acid metal salt having a hydrocarbyl group is preferably at least one kind selected from an alkaline metal and an alkaline earth metal.

Examples of the alkali metal include lithium, sodium, and potassium. In addition, examples of the alkaline earth metal include calcium, strontium, and barium. Of those, at least one metal selected from sodium, calcium, and barium is preferably used from the viewpoint of improving the abrasion resistance of the sliding member.

That is, at least one kind selected from a sodium sulfonate, a calcium sulfonate, and a barium sulfonate is preferably used. Further, sodium dodecylbenzenesulfonate, calcium dinonylnaphthalene sulfonate, and barium dinonylnaphthalene sulfonate are preferably used as the sodium sulfonate, the calcium sulfonate, and the barium sulfonate, respectively.

Of those, a barium sulfonate, especially barium dinonylnaphthalene sulfonate is particularly preferably used from the viewpoint of improving the abrasion resistance of the sliding part.

In addition, the molecular weight of the sulfonic acid constituting the sulfonic acid metal salt having a hydrocarbyl group is preferably from 200 to 800 from the viewpoint of its dispersibility in the lubricating oil composition.

<Phosphoric Acid Ester>

An example of the phosphoric acid ester is at least one kind of organic phosphoric acid compound selected from a phosphoric acid ester, an acidic phosphoric acid ester, a phosphorous acid ester, and an acidic phosphorous acid ester.

The phosphoric acid ester and the phosphorous acid ester each have a hydrocarbon group having 2 to 18 carbon atoms in its molecule. Examples of the hydrocarbon group having 2 to 18 carbon atoms may include an alkyl group and an alkenyl group each having 2 to 18 carbon atoms, an aryl group having 6 to 18 carbon atoms, and an aralkyl group having 7 to 18 carbon atoms.

Each of the alkyl group and the alkenyl group may be linear, branched, or cyclic, and examples thereof include an ethyl group, an n-propyl group, an isopropyl group, an n-butyl group, an isobutyl group, a sec-butyl group, a tert-butyl group, various pentyl groups, various hexyl groups, various octyl groups, various decyl groups, various dodecyl groups, various tetradecyl groups, various hexadecyl groups, various octadecyl groups, a cyclopentyl group, a cyclohexyl group, an allyl group, a propenyl group, various butenyl groups, various hexenyl groups, various octenyl groups, various decenyl groups, various dodecenyl groups, various tetradecenyl groups, various hexadecenyl groups, various octadecenyl groups, a cyclopentenyl group, and a cyclohexenyl group.

Examples of the aryl group having 6 to 18 carbon atoms include a phenyl group, a tolyl group, a xylyl group, and a naphthyl group. Examples of the aralkyl group having 7 to 18 carbon atoms include a benzyl group, a phenethyl group, a naphthylmethyl group, a methylbenzyl group, a methylphenethyl group, and a methylnaphthylmethyl group.

In addition, examples of the phosphoric acid ester may include an acidic phosphoric acid monoester, an acidic phosphoric acid diester, and a phosphoric acid triester.

Examples of the acidic phosphoric acid monoester include monoethyl acid phosphate, mono-n-propyl acid phosphate, mono-n-butyl acid phosphate, mono-2-ethylhexyl acid phosphate, monolauryl acid phosphate, monomyristyl acid phosphate, monopalmityl acid phosphate, monostearyl acid phosphate, and monooleyl acid phosphate.

Examples of the acidic phosphoric acid diester include di-n-butyl acid phosphate, di-2-ethylhexyl acid phosphate, didecyl acid phosphate, didodecyl acid phosphate (dilauryl acid phosphate), di(tridecyl) acid phosphate, dioctadecyl acid phosphate (distearyl acid phosphate), and di-9-octadecenyl acid phosphate (dioleyl acid phosphate).

Examples of the phosphoric acid triester include a triaryl phosphate, a trialkyl phosphate, a trialkylaryl phosphate, a triarylalkyl phosphate, and a trialkenyl phosphate. Examples thereof may include triphenyl phosphate, tricresyl phosphate, benzyldiphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, di(ethylphenyl) phenyl phosphate, propylphenyl diphenyl phosphate, di(propylphenyl) phenyl phosphate, triethyl phenyl phosphate, tripropylphenyl phosphate, butylphenyl diphenyl phosphate, di(butylphenyl) phenyl phosphate, tributylphenyl phosphate, trihexyl phosphate, tri (2-ethylhexyl) phosphate, tridecyl phosphate, trilauryl phosphate, trimyristyl phosphate, tripalmityl phosphate, tristearyl phosphate, and trioleyl phosphate. Tricresyl phosphate is preferred from the viewpoint of performance.

Of those phosphoric acid esters, an acidic phosphoric acid monoester and an acidic phosphoric acid diester are suitable from the viewpoint of performance or the like.

For example, an acidic phosphorous acid diester and a phosphorous acid triester may be used as the phosphorous acid ester.

Examples of the acidic phosphorous acid diester include di-n-butyl hydrogen phosphite, di-2-ethylhexyl hydrogen phosphite, didecyl hydrogen phosphite, didodecyl hydrogen phosphite (dilauryl hydrogen phosphite), dioctadecyl hydrogen phosphite (distearyl hydrogen phosphite), di-9-octadecenyl hydrogen phosphite (dioleyl hydrogen phosphite), and diphenyl hydrogen phosphite.

In addition, examples of the phosphorous acid trieser include triethyl phosphite, tri-n-butyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenyl isodecyl phosphite, tristearyl phosphite, and trioleyl phosphite.

Of those phosphorous acid esters, an acidic phosphorous acid diester is suitable from the viewpoint of performance or the like. Di-9-octadecenyl hydrogen phosphite (dioleyl hydrogen phosphite) is suitable as a specific compound thereof.

In the lubricating oil composition for a refrigerating machine of the present invention, one or more kinds of the phosphoric acid esters may be used, one or more kinds of the phosphorous acid esters may be used, or one or more kinds of the phosphoric acid esters and one or more kinds of the phosphorous acid esters may be used in combination.

In addition, the content of the phosphoric acid ester preferably falls within the range of from 0.01 to 4 mass % with respect to the total amount of the lubricating oil composition for a refrigerating machine. When the content falls within the range, sufficient abrasion resistance is obtained. The content is more preferably from 0.03 to 3 mass %, particularly preferably from 0.1 to 2 mass %.

From the viewpoint of a combination with various sulfonic acid metal salts having hydrocarbyl groups, a combination of a sulfonic acid metal salt using at least one metal selected from sodium, calcium, and barium, and a phosphoric acid triester is suitable. More specifically, for example, a combination of at least one selected from a sodium sulfonate, a calcium sulfonate, and a barium sulfonate, and tricresyl phosphate is preferred. In addition, further blending any such combination with an acidic phosphorous acid diester additionally improves the abrasion resistance. Di-9-octadecenyl hydrogen phosphite (dioleyl hydrogen phosphite) is suitable as the acidic phosphorous acid diester to be combined.

<Other Blending Agents>

At least one kind of additive selected from, for example, an extreme pressure agent, an oiliness agent, an antioxidant, an acid scavenger, and an antifoaming agent may be incorporated into the lubricating oil composition for a refrigerating machine of the present invention.

<<Extreme Pressure Agent>>

Examples of the extreme pressure agent include a phosphorus-based extreme pressure agent and metal salts of carboxylic acids. The term "metal salts of carboxylic acids" as used herein preferably refers to metal salts of carboxylic acids each having 3 to 60 carbon atoms, and, further, fatty acids each having 3 to 30, in particular, 12 to 30 carbon atoms. Further examples thereof include metal salts of: dimer acids and trimer acids of the fatty acids; and dicarboxylic acids each having 3 to 30 carbon atoms. Of those, a metal salt of a fatty acid having 12 to 30 carbon atoms or of a dicarboxylic acid having 3 to 30 carbon atoms is particularly preferred.

On the other hand, the metal constituting that the metal salt is preferably an alkali metal or an alkaline earth metal, particularly optimally an alkali metal.

Further, examples of the extreme pressure agents other than those mentioned above may include sulfur-based extreme pressure agents such as sulfurized oils and fats, sulfurized fatty acids, sulfurized esters, sulfurized olefins, dihydrocarbyl polysulfide, thiocarbamates, thioterpenes, and dialkyl thiodipropionates.

The blending amount of the extreme pressure agent falls within the range of preferably from 0.001 to 5 mass % in ordinary cases, particularly preferably from 0.005 to 3 mass % based on the total amount of the composition in terms of lubricity and stability.

One kind of the extreme pressure agents may be used alone, or two or more kinds thereof may be used in combination.

<<Oiliness Agent>>

Examples of the oiliness agents include: aliphatic saturated and unsaturated monocarboxylic acids such as stearic acid and oleic acid; polymerized fatty acids such as dimer acids and hydrogenated dimer acids; hydroxy fatty acids such as ricinoleic acid and 12-hydroxystearic acid; aliphatic saturated and unsaturated monohydric alcohols such as lauryl alcohol and oleyl alcohol; aliphatic saturated and unsaturated monoamines such as stearyl amine and oleylamine; aliphatic saturated and unsaturated monocarboxylic acid amides such as lauric acid amide and oleic acid amide; and partial esters of a polyhydric alcohol such as glycerin and sorbitol, and an aliphatic saturated or unsaturated monocarboxylic acid.

One kind of the oiliness agents may be used alone, or two or more kinds thereof may be used in combination. In addition, the blending amount of the oiliness agent is selected from the range of typically from 0.01 to 10 mass %, preferably from 0.1 to 5 mass % based on the total amount of the composition.

<<Antioxidant>>

A phenol-based antioxidant such as 2,6-di-tert-butyl-4-methylphenol, 2,6-di-tert-butyl-4-ethylphenol, or 2,2'-methylenebis(4-methyl-6-tert-butylphenol) or an amine-based antioxidant such as phenyl-α-naphthylamine or N,N'-di-phenyl-p-phenylenediamine is preferably blended as the antioxidant. The antioxidant is blended in the composition at a content of typically from 0.01 to 5 mass %, preferably from 0.05 to 3 mass % in terms of an effect, economical efficiency, and the like.

<<Acid Scavenger>>

Examples of the acid scavenger may include: phenyl glycidyl ether; an alkyl glycidyl ether; an alkylene glycol glycidyl ether; cyclohexeneoxide; an α-olefinoxide; and an epoxy compound such as epoxidized soybean oil. Of those, phenyl glycidyl ether, an alkyl glycidyl ether, analkyleneglycol glycidyl ether, cyclohexeneoxide, or an α-olefinoxide is preferred in terms of compatibility.

Each of an alkyl group of the alkylglycidyl ether and an alkylene group of the alkylene glycol glycidyl ether may be branched, and has typically 3 to 30, preferably 4 to 24, particularly preferably 6 to 16 carbon atoms. In addition, one having a total of generally 4 to 50, preferably 4 to 24, particularly preferably 6 to 16 carbon atoms is used as the α-olefinoxide. In the present invention, one kind of the acid scavengers may be used, or two or more kinds thereof may be used in combination. In addition, the blending amount of the acid scavenger falls within the range of preferably from 0.005 to 5 mass % in ordinary cases, particularly preferably from 0.05 to 3 mass % with respect to the composition in terms of an effect and the suppression of the generation of sludge.

In the present invention, the stability of the lubricating oil composition for a refrigerating machine can be improved by blending the acid scavenger. The combined use of the extreme pressure agent and the antioxidant with the acid scavenger exhibits an additional improving effect on the stability.

<<Antifoaming Agent>>

Examples of the antifoaming agent may include a silicone oil and a fluorinated silicone oil. In the lubricating oil composition for a refrigerating machine of the present invention, any other known various additives, for example, a copper inactivator such as N—[N,N'-dialkyl (alkyl group having 3 to 12 carbon atoms) aminomethyl]triazole may be appropriately blended as long as the object of the present invention is not inhibited.

[Used Amounts of Refrigerant and Lubricating Oil Composition for Refrigerating Machine]

The lubricating oil composition for a refrigerating machine of the present invention is applicable to a refrigerating machine employing a refrigerant including at least one kind of fluorine-containing organic compound selected from fluorinated ether compounds, fluorinated alcohol compounds, and fluorinated ketone compounds, or a combination of the fluorine-containing organic compound and a saturated fluorinated hydrocarbon compound.

The used amounts of any one of the various refrigerants and the lubricating oil composition for a refrigerating machine in a method of lubricating a refrigerating machine that uses the lubricating oil composition for refrigerating machine of the present invention are such that a mass ratio of the refrigerant to the lubricating oil composition for a refrigerating machine falls within the range of preferably from 99/1 to 10/90, more preferably from 95/5 to 30/70. An amount of the refrigerant below the range is not preferred because a reduction in refrigerating capacity of the refrigerating machine is observed. In addition, an amount of the refrigerant beyond the range is not preferred because the lubricity of the composition reduces. The lubricating oil composition for a refrigerating machine of the present invention, which may be used in any one of various refrigerating machines, is particularly preferably applicable to the compression refrigerating cycle of a compression refrigerating machine.

[Refrigerating Machine]

The refrigerator to which the lubricating oil composition for a refrigerating machine of the present invention is applied has a refrigerating cycle having the construction essentially requiring a compressor, a condenser, an expansion mechanism (such as an expansion valve), and an evaporator, or a compressor, a condenser, an expansion mechanism, a drier, and an evaporator, uses the above-mentioned lubricating oil composition for a refrigerating machine of the present invention as a refrigerating machine oil, and uses the above-mentioned various refrigerants as refrigerants.

In this case, the drier is preferably filled with a desiccant formed of zeolite having a pore diameter of 0.33 nm or less. In addition, examples of the zeolite may include a natural zeolite and a synthetic zeolite. Zeolite having a $CO_2$ gas-absorbing capacity of 1.0% or less at 25° C. and a $CO_2$ gas partial pressure of 33 kPa is more suitable. Examples of the synthetic zeolite described above may include XH-9 (trade name) and XH-600 (trade name) manufactured by UNION SHOWA K. K. When the desiccant is used, moisture can be removed efficiently without the absorption of the refrigerant in the refrigerating cycle, and simultaneously, powderization of the desiccant due to deterioration of the desiccant itself can be suppressed. This allows the refrigerating machine to be driven stably for a long time period because there is no risk of clogging of pipes caused by the powderization or abnormal abrasion caused by entering of the powder into a sliding part of the compressor.

<Sliding Part>

Various sliding parts (such as a bearing) are present in a compressor in a refrigerating machine to which the lubricating oil composition for a refrigerating machine of the present invention is applied. In the embodiment of the present invention, a sliding part formed of iron alone, or of an iron base alloy containing iron as a main component is particularly preferably applicable to each of those sliding parts. In addition to the iron base alloy, an alloy such as an aluminum base alloy or a copper base alloy is available.

It should be noted that a part formed of engineering plastic, or a part having an organic coating film or an inorganic coating film may be used as each of the sliding parts. Preferred examples of the engineering plastic may include a polyamide resin, a polyphenylene sulfide resin, and a polyacetal resin in terms of sealing property, sliding property, abrasion resistance, and the like. In addition, examples of the organic coating film may include a fluorine-containing resin coating film (such as a polytetrafluoroethylene coating film), a polyimide coating film, and a polyamideimide coating film in terms of sealing property, sliding property, abrasion resistance, and the like.

Examples of the inorganic coating film include a graphite film, a diamond-like carbon film, a nickel film, a molybdenum film, a tin film, and a chromium film in terms of sealing property, sliding property, abrasion resistance, and the like. The inorganic coating film may be formed by plating treatment, or may be formed by a physical vapor deposition method (PVD).

[Refrigerating Equipment]

The lubricating oil composition for a refrigerating machine of the present invention may be used in refrigerating equipment for a car air conditioner, an electrically-driven air conditioner, a gas heat pump, an air conditioner, a cold storage, a vending machine, a showcase, a hot water supply system, a refrigerating and heating system, or the like.

EXAMPLES

Hereinafter, the present invention is described more detail by way of Examples. However, the present invention is not limited to Examples shown below. Lubricating oil compositions for refrigerating machines according to Examples and Comparative Examples were evaluated for their characteristics in accordance with the following evaluation methods.

[Evaluation Method]

<Actual Machine Test>

A base oil and a refrigerant were blended at a ratio "base oil/refrigerant" of 160 g/1,400 g in terms of a mass ratio to prepare a lubricating oil composition, and the composition was used in a horizontal scroll compressor.

The compressor was operated under the use conditions of 6,500 rpm, a Pd of 2.6 MPa, and a Ps of 0.12 MPa for 100 hours, and then the surface roughness (μm) of sliding parts was measured in conformity with JIS 0601-1976. The sliding parts are a crank shaft for swirling a swirl scroll and a bearing, and are each formed of an Fe base alloy. The surface roughness of the crank shaft in a part sliding with respect to the bearing was measured. A value for the surface roughness is a value for a maximum height Rmax.

<Evaluation for Storage Stability>

An evaluation for storage stability was performed as described below. 400 Milliliters of a lubricating oil composition as an evaluating object were charged into a 500-mL vented glass container and stored in a dark place kept at −5° C. for 10 days. The presence or absence of a precipitate before and after a storage test was examined. Such a composition that the precipitate was observed was represented as "present," and such a composition that the precipitate was not observed was represented as "absent."

<Sealed Tube Test>

A catalyst Fe/Cu/Al was loaded into a glass tube and a lubricating oil composition as an evaluating object was filled into the tube at a ratio "base oil/refrigerant (HFC1234yf)" of 4 mL/1 g, followed by the sealing of the tube. The composition was retained at 175° C. for 14 days, and then an oil appearance, a catalyst appearance, and the presence or absence of sludge were examined.

<Falex Abrasion Test>

A Falex tester was used, and a combination of AISIC1137 and SAE3135 was used as a pin/block combination. The pin/block combination was set in the Falex tester, 200 g of a lubricating oil composition as an evaluating object (HFC1234yf was used as a refrigerant) were charged into a test container, and a carbon dioxide gas was blown into the container at 5 L/h. After that, the number of revolutions, an oil temperature, and a load were set to 300 rpm, 80° C., and 1,335 N, respectively, and a block abrasion loss (mg) and a pin abrasion loss (mg) were measured.

Examples and Comparative Examples

The following components were prepared according to blending formulation shown in Table 1 to provide lubricating oil compositions of Examples 1 to 10, and Comparative Examples 1 and 2. In addition, the compositions were evaluated by the methods described above. Table 1 shows the results. Compounds used in Examples and Comparative Examples are as described below.

Base oil A1: polypropylene glycol dimethyl ether (kinematic viscosity: 50.7 mm$^2$/s at 40° C., kinematic viscosity at 100° C.: 10.8 mm$^2$/s)

Base oil A2: polyoxypropylene-polyoxyethylene copolymer dimethyl ether (PO/EO molar ratio of 9:1, kinematic viscosity: 44.5 mm$^2$/s at 40° C., kinematic viscosity at 100° C.: 10.0 mm$^2$/s)

Base oil A3: polyethyl vinyl ether-polyisobutyl vinyl ether copolymer (EO/BO molar ratio of 1:9, kinematic viscosity at 40° C.: 68 mm$^2$/s)

Base oil A4: polyoxyalkylene glycol-modified polyvinyl ether copolymer (ECP) (kinematic viscosity at 100° C.: 11.48 mm$^2$/s)

Additive B1: tricresyl phosphate (TCP)

Additive B2: dioleyl hydrogen phosphite

Additive B3: barium sulfonate (barium dinonylnaphthalene sulfonate, trade name: "NASUL BSB", manufactured by KING IND)

Additive B4: calcium sulfonate (calcium dinonylnaphthalene sulfonate, trade name: "NASUL 729", manufactured by KING IND)

Additive B5: sodium sulfonate (sodium dodecylbenzene sulfonate, manufactured by Wako Pure Chemical Industries, Ltd.)

Additive B6: sodium oleate

Refrigerant C: HFO1234yf

TABLE 1

| | | Example 1 | Example 2 | Example 3 | Example 4 | Example 5 | Example 6 |
|---|---|---|---|---|---|---|---|
| Lubricating oil composition Blending amount (mass %) | Base oil A1 | 98.99 | 98.98 | 98.9 | 98.8 | 98.99 | 98.99 |
| | Base oil A2 | 0 | 0 | 0 | 0 | 0 | 0 |
| | Base oil A3 | 0 | 0 | 0 | 0 | 0 | 0 |
| | Base oil A4 | 0 | 0 | 0 | 0 | 0 | 0 |
| | Additive B1 | 1 | 1 | 1 | 1 | 1 | 1 |
| | Additive B2 | 0 | 0 | 0 | 0 | 0 | 0 |
| | Additive B3 | 0.01 | 0.02 | 0.1 | 0.2 | 0 | 0 |
| | Additive B4 | 0 | 0 | 0 | 0 | 0.01 | 0 |
| | Additive B5 | 0 | 0 | 0 | 0 | 0 | 0.01 |
| | Additive B6 | 0 | 0 | 0 | 0 | 0 | 0 |
| Refrigerant | Refrigerant C [base oil (g)/refrigerant (g)] | 160/1,400 | 160/1,400 | 160/1,400 | 160/1,400 | 160/1,400 | 160/1,400 |

TABLE 1-continued

| | | | | | | | |
|---|---|---|---|---|---|---|---|
| Result of evaluation | Actual machine test | Surface roughness [Rmax] (μm) | 6.58 | 3.51 | 3.08 | 2.25 | 7.1 | 14.3 |
| | Storage stability | Presence or absence of precipitate | Absent | Absent | Absent | Absent | Absent | Absent |
| | Sealed tube test | Oil appearance | Good | Good | Good | Good | Good | Good |
| | | Cu appearance | Good | Good | Good | Good | Good | Good |
| | | Presence or absence of sludge | Absent | Absent | Absent | Absent | Absent | Absent |
| | Falex abrasion test | Pin abrasion loss (mg) | 8 | 6 | 3 | 3 | 5 | 2 |

| | | Example 7 | Example 8 | Example 9 | Example 10 | Comparative Example 1 | Comparative Example 2 |
|---|---|---|---|---|---|---|---|
| Lubricating oil composition Blending amount (mass %) | Base oil A1 | 0 | 0 | 0 | 98.5 | 99 | 98.8 |
| | Base oil A2 | 98.8 | 0 | 0 | 0 | 0 | 0 |
| | Base oil A3 | 0 | 98.8 | 0 | 0 | 0 | 0 |
| | Base oil A4 | 0 | 0 | 98.5 | 0 | 0 | 0 |
| | Additive B1 | 1 | 1 | 1 | 1 | 1 | 1 |
| | Additive B2 | 0 | 0 | 0.3 | 0.3 | 0 | 0 |
| | Additive B3 | 0.2 | 0.2 | 0.2 | 0.2 | 0 | 0 |
| | Additive B4 | 0 | 0 | 0 | 0 | 0 | 0 |
| | Additive B5 | 0 | 0 | 0 | 0 | 0 | 0 |
| | Additive B6 | 0 | 0 | 0 | 0 | 0 | 0.2 |
| Refrigerant | Refrigerant C [base oil (g)/refrigerant (g)] | 160/1,400 | 160/1,400 | 160/1,400 | 160/1,400 | 160/1,400 | 160/1,400 |
| Result of evaluation | Actual machine test | Surface roughness [Rmax] (μm) | 2.4 | 3.3 | 2.1 | 2 | 120 | 135 |
| | Storage stability | Presence or absence of precipitate | Absent | Absent | Absent | Absent | Absent | Absent |
| | Sealed tube test | Oil appearance | Good | Good | Good | Good | Good | Brown |
| | | Cu appearance | Good | Good | Good | Good | Good | Color change |
| | | Presence or absence of sludge | Absent | Absent | Absent | Absent | Absent | Present |
| | Falex abrasion test | Pin abrasion loss (mg) | 2 | 3 | 3 | 3 | 45 | 56 |

[Result of Evaluation]

The lubricating oil compositions for refrigerating machines of Examples 1 to 10 of Table 1 are dramatically suppressed in both surface roughness and pin abrasion loss as compared to Comparative Example 1 not blended with any sulfonic acid metal salt having a hydrocarbyl group. Although Comparative Example 2 is blended with the additive B6, the results in the surface roughness, the pin abrasion loss, and the sealed tube test are worse than those of Examples 1 to 10 even when the additives B1 and B6 are used in combination.

As can be seen from Examples 1 to 8 of Table 1, when the same base oil component is used, increasing the blending amount of the additive B component can reduce the surface roughness and reduce the pin abrasion loss. It is understood from the foregoing that the additive B component contributes to a reduction in abrasion. The amount of the additive B4 or B5 may be smaller than that of the additive B1 or B3 from the following viewpoint: the former additive can reduce the pin abrasion loss even when its amount is smaller than that of the latter.

Comparison between Example 4 and Example 9 or 10 shows that further combining the phosphoric acid ester-based additive B1 and the additive B3 based on a sulfonic acid metal salt having a hydrocarbyl group with the phosphite-based additive B2 can improve a reducing effect on the surface roughness.

The invention claimed is:

1. A lubricating oil composition for a refrigerating machine,
    wherein the refrigerating machine comprises a refrigerant which comprises at least one fluorine-containing organic compound selected from molecular formula (A) or comprises a combination of the fluorine-containing organic compound and a saturated fluorinated hydrocarbon compound:

$$C_pO_qF_rR_s \tag{A}$$

wherein R represents Cl, Br, I, or H; p represents an integer of from 1 to 6, q represents an integer of from 0 to 2, r represents an integer of from 1 to 14, and s represents an integer of from 0 to 13, provided that, when q represents 0, p represents an integer from 2 to 6 and (A) comprises one or more carbon-carbon unsaturated bonds, and the lubricating oil composition comprises
a base oil comprising as a main component at least one compound selected from the group consisting of polyoxyalkylene glycols, polyvinyl ethers, copolymers of poly(oxy)alkylene glycols or monoethers thereof, polyvinyl ethers, polyol esters, and polycarbonates;
a sulfonic acid metal salt having a hydrocarbyl group, and
a phosphoric acid ester.

2. The lubricating oil composition for a refrigerating machine according to claim 1, wherein the refrigerant comprises an unsaturated fluorinated hydrocarbon compound.

3. The lubricating oil composition for a refrigerating machine according to claim 2, wherein the refrigerant comprises at least one selected from the group consisting of 1,1,1,2,3-pentafluoropropene (HFO-1225ye), 1,1,1,2-tetrafluoro-2-propene (HFO-1234yf), and 1,1,1,3-tetrafluoropropene (HFO-1234ze).

4. The lubricating oil composition for a refrigerating machine according to claim 1, wherein a blending amount of the sulfonic acid metal salt is from 0.001 to 2% with respect to a total amount of the lubricating oil composition.

5. The lubricating oil composition for a refrigerating machine according to claim 1, wherein the metal in the sulfonic acid metal salt comprises at least one selected from the group consisting of an alkali metal and an alkaline earth metal.

6. The lubricating oil composition for a refrigerating machine according to claim 1, wherein the metal in the sulfonic acid metal salt comprises at least one selected from the group consisting of an alkali metal and an alkaline earth metal, and the phosphoric acid ester comprises a phosphoric acid triester.

7. The lubricating oil composition for a refrigerating machine according to claim 1, wherein the metal in the sulfonic acid metal salt comprises at least one selected from the group consisting of an alkali metal and an alkaline earth metal, and the phosphoric acid ester comprises a phosphoric acid triester and an acidic phosphorous acid diester.

8. The lubricating oil composition for a refrigerating machine according to claim 6, wherein the metal in the sulfonic acid metal salt comprises barium.

9. The lubricating oil composition for a refrigerating machine according to claim 1, wherein the hydrocarbyl group has from 8 to 40 carbon atoms.

10. The lubricating oil composition for a refrigerating machine according to claim 1, wherein a sulfonic acid comprising the sulfonic acid metal salt having a hydrocarbyl group has an average molecular weight of from 200 to 800.

11. The lubricating oil composition for a refrigerating machine according to claim 1, wherein the base oil comprises a polyoxyalkylene glycol.

12. The lubricating oil composition for a refrigerating machine according to claim 1, wherein the base oil has a kinematic viscosity of from 2 to 50 mm$^2$/s at 100° C.

13. The lubricating oil composition for a refrigerating machine according to claim 1, wherein the base oil has a number average molecular weight of 500 or more.

14. The lubricating oil composition for a refrigerating machine according to claim 1, wherein sliding parts of the refrigerating machine are each formed of iron or of an iron base alloy which comprises iron as a main component.

15. A refrigeration machine comprising
a refrigerant and a lubricating oil composition;
wherein
said refrigerant comprises at least one fluorine-containing organic compound selected from molecular formula (A) or comprises a combination of the fluorine-containing organic compound (A) and a saturated fluorinated hydrocarbon compound:

$$C_pO_qF_rR_s \qquad (A),$$

where R represents Cl, Br, I, or H, p represents an integer of from 1 to 6, q represents an integer of from 0 to 2, r represents an integer of from 1 to 14, and s represents an integer of from 0 to 13, provided that, when q represents 0, p represents an integer from 2 to 6 and (A) comprises one or more carbon-carbon unsaturated bonds, and
said lubricating oil composition comprises
a base oil comprising as a main component at least one compound selected from the group consisting of polyoxyalkylene glycols, polyvinyl ethers, copolymers of poly(oxy)alkylene glycols or monoethers thereof, polyvinyl ethers, polyol esters, and polycarbonates;
a sulfonic acid metal salt having a hydrocarbyl group, and
a phosphoric acid ester.

16. A method for improving the abrasion resistance of a sliding part in a refrigeration machine, said method comprising
blending a lubricating oil composition and a refrigerant together thereby producing a mixed composition,
applying said mixed composition to the sliding part in the refrigeration machine; wherein
the lubricating oil comprises
a base oil comprising as a main component at least one compound selected from the group consisting of polyoxyalkylene glycols, polyvinyl ethers, copolymers of poly(oxy)alkylene glycols or monoethers thereof, polyvinyl ethers, polyol esters, and polycarbonates;
a sulfonic acid metal salt having a hydrocarbyl group, and
a phosphoric acid ester; and wherein
the refrigerant comprises
at least one fluorine-containing organic compound selected from molecular formula (A) or comprises a combination of the fluorine-containing organic compound and a saturated fluorinated hydrocarbon compound:

$$C_pO_qF_rR_s \qquad (A),$$

and R represents Cl, Br, I, or H, p represents an integer of from 1 to 6, q represents an integer of from 0 to 2, r represents an integer of from 1 to 14, and s represents an integer of from 0 to 13, provided that, when q represents 0, p represents an integer from 2 to 6 and (A) comprises one or more carbon-carbon unsaturated bonds.

17. The refrigeration machine according to claim 15, wherein said machine is a car air conditioner, an electrically-driven air conditioner, a gas heat pump, an air conditioner, a cold storage, a vending machine, a showcase, a hot water supply system, or a refrigerating and heating system.

18. The method according to claim 16, wherein said machine is a car air conditioner, an electrically-driven air conditioner, a gas heat pump, an air conditioner, a cold storage, a vending machine, a showcase, a hot water supply system, or a refrigerating and heating system.

19. The refrigeration machine according to claim 15,
wherein the metal in the sulfonic acid metal salt comprises at least one selected from the group consisting of an alkali metal and an alkaline earth metal, and the phosphoric acid ester comprises a phosphoric acid triester and an acidic phosphorous acid diester.

20. The method according to claim 16, wherein the metal in the sulfonic acid metal salt comprises at least one selected from the group consisting of an alkali metal and an alkaline earth metal, and the phosphoric acid ester comprises a phosphoric acid triester and an acidic phosphorous acid diester.

* * * * *